(12) United States Patent
Lee et al.

(10) Patent No.: US 10,270,095 B2
(45) Date of Patent: *Apr. 23, 2019

(54) LITHIUM BATTERY

(71) Applicant: Samsung SDI Co., Ltd., Yongin-si, Gyeonggi-do (KR)

(72) Inventors: Soon-Rewl Lee, Yongin-si (KR); Ick-Kyu Choi, Yongin-si (KR); Young-Ki Kim, Yongin-si (KR); Young-Hun Lee, Yongin-si (KR); Na-Ri Park, Yongin-si (KR); Yong-Chul Park, Yongin-si (KR); Hong-Kyu Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 338 days.

This patent is subject to a terminal disclaimer.

(21) Appl. No.: 14/593,887

(22) Filed: Jan. 9, 2015

(65) Prior Publication Data

US 2015/0228979 A1 Aug. 13, 2015

(30) Foreign Application Priority Data

Feb. 13, 2014 (KR) ........................ 10-2014-0016788

(51) Int. Cl.
*H01M 4/525* (2010.01)
*H01M 4/505* (2010.01)
*H01M 4/485* (2010.01)
*H01M 4/583* (2010.01)
*H01M 10/0525* (2010.01)
*H01M 4/36* (2006.01)
*H01M 4/48* (2010.01)
*H01M 4/587* (2010.01)

(52) U.S. Cl.
CPC ........... *H01M 4/525* (2013.01); *H01M 4/364* (2013.01); *H01M 4/483* (2013.01); *H01M 4/505* (2013.01); *H01M 4/587* (2013.01); *H01M 10/0525* (2013.01); *H01M 2220/20* (2013.01); *Y02E 60/122* (2013.01); *Y02T 10/7011* (2013.01)

(58) Field of Classification Search
CPC ...... H01M 4/505; H01M 4/485; H01M 4/525; H01M 4/583
See application file for complete search history.

(56) References Cited

U.S. PATENT DOCUMENTS

2004/0023117 A1* 2/2004 Imachi .................. H01M 4/131
429/231.95
2005/0271943 A1* 12/2005 Park .................... C01G 45/1242
429/231.1
(Continued)

FOREIGN PATENT DOCUMENTS

JP 2011-113863 A 6/2011
KR 10-2007-0095201 A 9/2007
(Continued)

*Primary Examiner* — Osei K Amponsah
(74) *Attorney, Agent, or Firm* — Knobbe, Martens, Olson & Bear, LLP (57) ABSTRACT

A lithium battery including a cathode; an anode; and an electrolyte disposed between the cathode and the anode is disclosed. In the lithium battery, the cathode includes a nickel-based lithium transition metal oxide having primary particles having an average particle diameter of 2 μm or more, and the anode includes graphite and a silicon-based compound.

18 Claims, 3 Drawing Sheets

(56) References Cited

U.S. PATENT DOCUMENTS

| | | | |
|---|---|---|---|
| 2006/0204845 A1* | 9/2006 | Chang | H01M 4/364 |
| | | | 429/209 |
| 2007/0099087 A1* | 5/2007 | Mihara | C01B 25/45 |
| | | | 429/231.95 |
| 2008/0026292 A1 | 1/2008 | Paulsen et al. | |
| 2011/0079752 A1 | 4/2011 | Park et al. | |
| 2012/0070743 A1* | 3/2012 | Kwon | C01G 53/50 |
| | | | 429/223 |
| 2012/0189913 A1* | 7/2012 | Wakizaka | H01M 4/133 |
| | | | 429/211 |
| 2013/0065118 A1* | 3/2013 | Chang | H01M 4/364 |
| | | | 429/211 |
| 2014/0057163 A1* | 2/2014 | Bae | H01M 4/485 |
| | | | 429/211 |

FOREIGN PATENT DOCUMENTS

| | | |
|---|---|---|
| KR | 10-2010-0130522 A | 12/2010 |
| KR | 10-2011-0027324 A | 3/2011 |

* cited by examiner

LITHIUM BATTERY

RELATED APPLICATIONS

Any and all applications for which a foreign or domestic priority claim is identified in the Application Data Sheet as filed with the present application are hereby incorporated by reference under 37 CFR 1.57. For example, this application claims the benefit of Korean Patent Application No. 10-2014-0016788, filed on Feb. 13, 2014, in the Korean Intellectual Property Office, the disclosure of which is incorporated herein in its entirety by reference.

BACKGROUND

Field

The present disclosure relates to lithium batteries.

Description of the Related Technology

For lithium batteries used in smaller and higher-performing devices, high energy-density is an important property in addition to small size and lightweight properties. Therefore, lithium batteries with high capacity are in demand.

Research has been active on lithium batteries with cathode active materials and anode active materials that have high capacity and excellent lifespan characteristics.

One example of an anode active material for the lithium battery is a carbonaceous material, such as graphite. Graphite has excellent capacity retention and other desirable properties including swelling less during the formation of an alloy with lithium. A battery formed using graphite has high stability but small electric capacity.

Examples of an anode active material that has higher electric capacity than a carbonaceous material include lithium-alloyable metal, an alloy of the lithium-alloyable metal, and an oxide of the lithium-alloyable metal. For example, the lithium-alloyable metal may be Si, Sn, or Al. Lithium-alloyable metal has very high electric capacity but poor lifespan.

One example of a cathode active material for a lithium battery is $LiCoO_2$. $LiCoO_2$ has excellent lifespan characteristics but small electric capacity.

A composite transition metal oxide, such as $LiNi_xCo_yMn_zO_2$ ($0<x<1$, $0<y<1$, and $0<z<1$), has higher electric capacity than $LiCoO_2$ but poor lifespan characteristics.

Accordingly, there is still a need to develop a lithium battery having high capacity and improved lifespan.

SUMMARY OF CERTAIN INVENTIVE ASPECTS

One aspect of the present disclosure relates to a lithium battery including a cathode; an anode; and an electrolyte disposed between the cathode and the anode, wherein the cathode comprises a nickel-based lithium transition metal oxide having primary particles with an average particle diameter of about 2 μm or greater and a lithium cobalt oxide, and wherein the anode comprises graphite and a silicon-based compound.

In some embodiments, an initial charging and discharging efficiency of the cathode is equal to or greater than an initial charging and discharging efficiency of the anode.

In some embodiments, the amount of the silicon-based compound is about 5 wt % or more based on the total weight of the graphite and the silicon-based compound.

In some embodiments, the amount of the silicon-based compound is in the range of about 5 wt % to about 25 wt % based on the total weight of graphite and the silicon-based compound.

In some embodiments, the silicon-based compound is silicon, silicon alloy, or silicon oxide.

In some embodiments, the silicon-based compound is a silicon oxide represented by Formula 1 below:

$$SiO_x \qquad \text{<Formula 1>}$$

wherein $0<x<2.0$.

In some embodiments, the silicon-based compound is selected from Si or Si—$Y^1$ alloy, wherein $Y^1$ is alkali metal, alkali earth metal, a Group 13 element, a Group 14 element, transition metal, rare earth element, or a combination thereof element and with the proviso that $Y^1$ is not Si.

In some embodiments, the nickel-based transition metal oxide is a compound represented by Formula 2 below:

$$Li_xCo_aNi_bM_cO_{2+\alpha} \qquad \text{<Formula 2>}$$

wherein $0.9<x<1.5$, $0<a<0.5$, $0<b<1$, $0<c<1$, and $-0.1 \le \alpha \le 0.1$, and M comprises at least one element selected from the group consisting of Mg, Ca, Sr, Ba, Ti, Zr, Nb, Mo, W, Zn, Al, Si, Ni, Mn, Cr, Fe, Mg, Sr, V, and a rare-earth element.

In some embodiments, the nickel-based transition metal oxide is a compound represented by Formula 3 below:

$$Li_xCo_aNi_bMn_cO_{2+\alpha} \qquad \text{<Formula 3>}$$

wherein $0.9<x<1.1$, $0<a<0.5$, $0.4<b<1$, $0<c<0.5$, and $-0.1 \le \alpha \le 0.1$.

In some embodiments, the nickel-based transition metal oxide is a compound represented by Formula 4 below:

$$Li_xCo_aNi_bMn_cO_2 \qquad \text{<Formula 4>}$$

wherein $0<x<1.1$, $0.1<a<0.3$, $0.4<b<0.6$, $0<c<0.5$, and $0.2<c<0.4$.

In some embodiments, in differential scanning calorimeter analysis of the nickel-based lithium transition metal oxide has an onset point temperature in the range of about 250° C. to about 270° C.

In some embodiments, the amount of the lithium cobalt oxide is 65 wt % or more based on the total amount of the nickel-based lithium transition metal oxide and the lithium cobalt oxide.

In some embodiments, the amount of the lithium cobalt oxide is in the range of about 70 wt % to 90 wt % based on the total amount of the nickel-based lithium transition metal oxide and the lithium cobalt oxide.

In some embodiments, nickel is doped on at least a portion of the lithium cobalt oxide.

In some embodiments, the amount of nickel is 20 mol % or less based on the total molar amount of nickel and cobalt.

In some embodiments, an initial charging and discharging efficiency of the cathode is 91.5% or less.

In some embodiments, the cathode has a mixture density of about 3.5 g/cc or greater.

In some embodiments, an initial charging and discharging efficiency of the anode is 88.0% or less.

In some embodiments, the cathode has an initial charging and discharging efficiency of about 200 mAh/g or more.

In some embodiments, the primary particles of the nickel-based transition metal oxide have an average particle diameter of about 3 μm to about 5 μm.

DETAILED DESCRIPTION OF CERTAIN INVENTIVE EMBODIMENTS

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a lithium battery according to an embodiment of the present disclosure will be described in detail below.

A lithium battery includes a cathode; an anode; and an electrolyte disposed between the cathode and the anode, wherein the cathode includes a nickel-based lithium transition metal oxide having primary particles with an average particle diameter of 2 μm or more and a lithium cobalt oxide and the anode includes graphite and a silicon-based compound.

The cathode of the lithium battery includes a nickel-based lithium transition metal oxide as a cathode active material, of which a primary particle is in the form of one body and has a particle diameter of about 2 μm or more, and a lithium cobalt oxide. The anode of the lithium battery includes graphite and a silicon-based compound at the same time as an anode active material. Accordingly, the cathode and the anode described above may provide high discharging capacity and increased lifespan characteristics at the same time.

Due to the inclusion of the nickel-based lithium transition metal oxide, of which the primary particle is in the form of one body and has a particle diameter of about 2 μm or more, and the lithium cobalt oxide in the cathode of the lithium battery, the mixture density of the cathode improves, and ultimately, the discharging capacity of the lithium battery may increase. In addition, the use of the cathode may lead to a decrease in the generation of gas at high voltage and an increase in thermal stability, thereby providing a lithium battery with improved lifespan characteristics.

The initial charging and discharging efficiency of the cathode may be equal to or higher than the initial charging and discharging efficiency of the anode, when the cathode includes the nickel-based lithium transition metal oxide, of which the primary particle is in the form of one body and has a particle diameter of about 2 μm or more, and the lithium cobalt oxide in the lithium battery. When the initial charging and discharging efficiency of the cathode is lower than the initial charging and discharging efficiency of the anode, the increase in discharging capacity per unit volume due to high mixture density stemming from the nickel-based lithium transition metal oxide may be offset by low charging and discharging efficiency.

In the lithium battery, the amount of the silicon-based compound may be about 5 wt % or greater based on the total weight of graphite and silicon-based compound. For example, the amount of the silicon-based compound in the lithium battery may be about 5 wt % to about 25 wt % or more based on the total weight of graphite and the silicon-based compound. When the amount of the silicon-based compound in the lithium battery is less than about 5 wt %, the initial charging and discharging efficiency of the anode may be higher than that of the cathode, and thus, discharging capacity of the lithium battery may reduce.

For example, the silicon-based compound may be silicon metal (metalloid), an alloy of silicon and other metal, or a silicon oxide, but is not limited thereto, and may be any one of various materials known as a silicon-based compound in the art.

For example, the silicon-based compound may be Si, Si—Y alloy (Y is an alkali metal, alkali earth-metal, a Group 13 element, a Group 14 element, a transition metal, a rare-earth element, or a combination thereof, and Y is not Si), or $SiO_a$ ($0<a<3$).

For example, the silicon-based compound may be a silicon oxide represented by Formula 1 below:

$$SiO_x \qquad \text{<FORMULA 1>}$$

wherein $0<x<2.0$.

For example, the nickel-based lithium transition metal oxide in the lithium battery may be a compound represented by Formula 2 below:

$$Li_xCo_aNi_bM_cO_{2+\alpha} \qquad \text{<FORMULA 2>}$$

wherein $0.9<x<1.5$, $0<a<0.5$, $0<b<1$, $0<c<1$, and $-0.1\le\alpha\le0.1$, and M includes at least one element selected from the group consisting of Mg, Ca, Sr, Ba, Ti, Zr, Nb, Mo, W, Zn, Al, Si, Mn, Cr, Fe, Mg, Sr, V, and a rare-earth element.

For example, the nickel-based lithium transition metal oxide in the lithium battery may be a compound represented by Formula 3 below:

$$Li_xCo_aNi_bMn_cO_{2+\alpha} \qquad \text{<FORMULA 3>}$$

wherein $0.9<x<1.1$, $0<a<0.5$, $0.4<b<1$, $0<c<0.5$, and $-0.1\le\alpha\le0.1$.

For example, the nickel-based lithium transition metal oxide in the lithium battery may be a compound represented by Formula 4 below:

$$Li_xCo_aNi_bMn_cO_2 \qquad \text{<FORMULA 4>}$$

wherein $0\le x<1.1$, $0.1<a<0.3$, $0.4<b<0.6$, and $0.2<c<0.4$.

In differential scanning calorimeter analysis of the nickel-based lithium transition metal oxide in the formation of one body in the lithium battery, the onset point temperature of the nickel-based lithium transition metal oxide is in the range of about 250° C. to about 270° C., that is, is higher than that of commercially available NCM (lithium nickel cobalt manganese oxide), and an instantaneous caloric amount of the main peak decreases. Due to such characteristics, a lithium battery including the nickel-based lithium transition metal oxide may have increased high-temperature stability.

In some embodiments, the nickel-based lithium transition metal oxide in the form of one body may have an average primary particle diameter of about 2 μm to about 5 μm. In some embodiments, the nickel-based lithium transition metal oxide in the form of one body may have an average primary particle diameter of about 3 μm to about 5 μm. When the primary particle diameter is less than 1 μm, the mixture density is low or high-rate characteristics may decrease. When the primary particle diameter is too big, the mixture density may decrease.

By controlling the primary particle diameter of the nickel-based lithium transition metal oxide in the form of one body in the lithium battery, the lithium battery manufactured by using the nickel-based lithium transition metal oxide produces less gas and is more reliable and stable at high voltage.

Since the nickel-based lithium transition metal oxide in the form of one body is calcined at a temperature of 1000° C. or more, the specific surface area of the nickel-based lithium transition metal oxide reduces, and the residual lithium is removed as much as possible, thereby suppressing the surface side reaction between the residual lithium and the electrolytic solution. In addition, since the calcination is performed at high temperature, crystalinity of the nickel-based lithium transition metal oxide improves and the stability of the battery at high voltage may be secured.

In the nickel-based lithium transition metal oxide in the form of one body, the amount of LiOH, which is a residual lithium, may be in the range of about 0.01 wt % to about 0.06 wt %, and the amount of $Li_2CO_3$, which is also a residual lithium, may be in the range of about 0.05 wt % to about 0.1 wt %. The amount of LiOH and $Li_2CO_3$ described herein can be measured by titration.

In the nickel-based lithium transition metal oxide in the form of one body, the amount of lithium carbonate measured by GC-MS analysis is in a range of about 0.01 to about 0.05 wt %.

As described above, when the amount of the residual lithium is low, the side reaction between the residual lithium and the electrolytic solution is suppressed and thus, the production of gas at high voltage and at high temperature is suppressed. When the amount of LiOH is low, the pH of the cathode slurry in the process of manufacturing the cathode slurry is low, and thus, the cathode slurry has stability, enabling the formation of a homogeneous electrode plate coating.

In the lithium battery, the cathode may additionally include a lithium cobalt oxide. The addition of the lithium cobalt oxide in an appropriate amount, can further increases the charging and discharging characteristics of the lithium battery.

In some embodiments, in the cathode of the lithium battery, the amount of the lithium cobalt oxide may be about 65 wt % or more based on the total amount of the nickel-based lithium transition metal oxide and the lithium cobalt oxide. In some embodiments, in the cathode of the lithium battery, the amount of the lithium cobalt oxide may be about 65 wt % to about 95 wt % based on the total amount of the nickel-based lithium transition metal oxide and the lithium cobalt oxide. In some embodiments, in the cathode of the lithium battery, the amount of the lithium cobalt oxide may be about 70 wt % to about 90 wt % based on the total amount of the nickel-based lithium transition metal oxide and the lithium cobalt oxide. When the lithium cobalt oxide fall within the ranges described above, further improved electrode characteristics may be obtained.

Nickel may be doped on at least a portion of the lithium cobalt oxide. Since nickel is additionally doped on the lithium cobalt oxide, charging capacity of the lithium cobalt oxide may increase.

In some embodiments, the amount of the nickel doped on the lithium cobalt oxide may be 20 mol % or less based on the total molar number of nickel and cobalt. In some embodiments, the amount of the nickel doped on the lithium cobalt oxide may be in a range of about 0.5 mol % to about 20 mol % based on the total molar number of nickel and cobalt. In some embodiments, the amount of nickel doped on the lithium cobalt oxide may be about 0.5 mol % to about 10 mol % based on the total molar number of nickel and cobalt. In some embodiments, the amount of nickel doped on the lithium cobalt oxide may be about 0.5 mol % to about 5 mol % based on the total molar number of nickel and cobalt.

When the amount of the nickel doped on the lithium cobalt oxide is too low, an increase in charging capacity is negligible, and when the amount of nickel doped on the lithium cobalt oxide is too great, charging and discharging voltage of the lithium cobalt oxide may decrease. In the case that nickel is doped on the lithium cobalt oxide, mixture density of the nickel doped lithium cobalt oxide may increase compared to when lithium cobalt oxide is simply mixed with a lithium nickel oxide.

The initial charging and discharging efficiency of the cathode of the lithium battery may be about 91.5% or less. In the case that a half cell including the cathode is, with respect to a lithium metal, charged with a constant current at a rate of 0.1 C until the voltage reaches 4.4 V (vs. Li), and while the voltage is maintained at 4.4V, the half cell is charged at a constant voltage until the current reaches 0.01 C, and then, the half cell is discharged at a constant current at a rate of 0.1 C until the voltage reaches 3.0 V (vs. Li), the initial charging and discharging efficiency of the cathode may be about 88.5% or less. When the initial charging and discharging efficiency of the cathode is more than 88.5%, discharging capacity may decrease. In some embodiments, the initial charging and discharging efficiency of the cathode in the lithium battery may be about 88% or less. In some embodiments, the initial charging and discharging efficiency of the cathode in the lithium battery may be about 87.5% or less. In some embodiments, the initial charging and discharging efficiency of the cathode in the lithium battery may be about 87% or less.

The mixed density of the cathode in the lithium battery may be about 3.5 g/cc or more. In some embodiments, the mixed density of the cathode in the lithium battery may be in a range of about 3.5 g/cc to about 3.9 g/cc. In some embodiments, the mixed density of the cathode in the lithium battery may be in a range of about 3.7 g/cc to about 3.9 g/cc. Due to the inclusion of a nickel-based lithium transition metal oxide in the form of one body in the cathode, compared to a cathode including a typical nickel-based lithium transition metal oxide that is not in the form of single body and having a mixture density of about 3.3 to about 3.5 g/cc, the cathode may include higher mixture density and thus may provide high discharging capacity per volume.

The initial charging and discharging efficiency of the anode of the lithium battery may be about 88.0% or less. In the case that a half cell including the anode is, with respect to a lithium metal, charged with a constant current at a rate of 0.1 C until the voltage reaches 0.01V (vs. Li), and while the voltage is maintained at 0.01V, the half cell is charged at a constant voltage until the current reaches 0.01 C, and then, the half cell is discharged at a constant current at a rate of 0.1 C until the voltage reaches 1.5V (vs. Li), the initial charging and discharging efficiency of the cathode may be about 88.0% or less. Since the anode has an initial charging and discharging efficiency as low as 88.0% or less in the lithium battery, the cathode having low initial charging and discharging efficiency may be used without any loss in discharge capacity.

The initial charging capacity of the cathode in the lithium battery may be 200 mAh/g or more. In the case that a half cell including the cathode is, with respect to a lithium metal, charged with a constant current at a rate of 0.1 C until the voltage reaches 4.5V (vs. Li), and while the voltage is maintained at 4.5V, the half cell is charged at a constant voltage until the current reaches 0.01 C, and then, the half cell is discharged at a constant current at a rate of 0.1 C until the voltage reaches 3.0 V (vs. Li), the initial charging capacity of the cathode may be 200 mAh/g or more.

One non-limiting example of the method of manufacturing a lithium battery is described below.

First, a cathode includes a nickel-based lithium transition metal oxide having a primary particle size of 1 μm or more and a lithium cobalt oxide as a cathode active material.

To manufacture the cathode, for example, the cathode active material, a conductive material, a binder, and a solvent are mixed to prepare a cathode active material composition. The cathode active material composition is directly coated on an aluminum current collector and dried to form a cathode plate including the cathode active material layer. In other embodiments, the cathode active material composition is cast on a separate support, and then a film exfoliated from the support is laminated on the aluminum current collector to prepare a cathode plate including a cathode active material layer.

Examples of the conductive material are carbon black, graphite particulate, natural graphite, artificial graphite, acetylene black, ketjen black, carbon fiber; carbon nanotube; metal powder or metal fiber or metal tube, such as copper, nickel, aluminum, or silver; and a conductive polymer, such as polyphenylene derivative, but the conductive material is not limited thereto and may be any one of the various conductive materials used in the art.

Polymers such as vinylidene fluoride/hexafluoropropylene copolymer, polyvinylidenefluoride, polyacrylonitrile, polymethylmetacrylate, polytetrafluoroethylene (PTFE), a mixture thereof, or a styrene butadiene rubber-based polymer may be used as a binder. Organic solvent N-methylpyrrolidone (NMP), acetone, water, or the like may be used as the solvent. However, the binder and the solvent are not limited thereto, and may be any of various materials available in the art.

In some cases, a plasticizer may be further included in the cathode active material composition to form pores inside the electrode plate.

The amounts of the cathode active material, the conductive material, the binder, and the solvent may be at the same levels as used in lithium batteries. According to the purpose and structure of a lithium battery, one or more of the conductive material, the binder, and the solvent maybe used.

Also, the cathode may further include, in addition to the nickel-based lithium transition metal oxide having a primary particle diameter of about 1 μm or more and lithium cobalt oxide, other typical cathode active materials that are different from the nickel-based lithium transition metal oxide and lithium cobalt oxide in terms of at least one of composition, particle diameter, and properties.

The typical cathode active material may be any one of various materials that are used as a lithium-containing metal oxide in the art. For example, at least one of a composite oxide including lithium and metal selected from cobalt (Co), manganese (Mn), nickel (Ni), and a combination thereof may be used, and detailed examples thereof include compounds represented by $Li_aA_{1-b}B^1{}_bD^1{}_2$ (wherein, $0.90 \leq a \leq 1$, and $0 \leq b \leq 0.5$); $Li_aE_{1-b}B^1{}_bO_{2-c}D^1{}_c$ (wherein, $0.90 \leq a \leq 1$, $0 \leq b \leq 0.5$, $0 \leq c \leq 0.05$); $LiE_{2-b}B^1{}_bO_{4-c}D^1{}_c$ (wherein, $0 \leq b \leq 0.5$, and $0 \leq c \leq 0.05$); $Li_aNi_{1-b-c}Co_bB^1{}_cD^1{}_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (wherein, $0.90 \leq a \leq 1$, $0 \leq b \leq 0.5$, $0 \leq c \leq 0.05$, and $0 < \alpha < 2$); $Li_aNi_{1-b-c}Mn_bB^1{}_cD^1{}_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (wherein, $0.90 \leq a \leq 1$, $0 \leq b \leq 0.5$, $0 \leq c \leq 0.05$, and $0 < \alpha < 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1$, $0 \leq b \leq 0.9$, $0 \leq c \leq 0.5$, and $0 \leq d \leq 0.5$, $0.001 \leq e \leq 0.1$); $Li_aNiG_bO_2$ (wherein, $0.90 \leq a \leq 1$, $0.001 \leq b \leq 0.1$); $Li_aCoG_bO_2$ (wherein, $0.90 \leq a \leq 1$, $0.001 \leq b \leq 0.1$); $Li_aMnG_bO_2$ (wherein, $0.90 \leq a \leq 1$, and $0.001 \leq b \leq 0.1$); $Li_aMn_2G_bO_4$ (wherein, $0.90 \leq a \leq 1$, and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A is Ni, Co, Mn, or a combination thereof; $B^1$ is Al, Ni, Co, Mn, Cr, Fe, Mg, Sr, V, a rare-earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; $I^1$ is Cr, V, Fe, Sc, Y, or a combination thereof; and J is V, Cr, Mn, Co, Ni, Cu, or a combination thereof.

For example, the typical positive active material may be $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \leq x \leq 0.5$, $0 \leq y \leq 0.5$), $LiFePO_4$, or the like.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. Mg, Al, Co, K, Na, Ca, Si, Ti, V, Sn, Ge, Ga, B, As, Zr, or a mixture thereof may be used as a coating element included in the coating layer. The coating layer may be formed by using any one of the various coating methods that are performed using the compounds and the elements and do not affect the properties of the cathode active material (for example, spray coating, immersion, or the like). These coating methods are obvious to one of ordinary skill in the art and thus, are not described in detail herein.

One non-limiting example of a method of manufacturing an anode is described below. The anode may be manufactured in the same manner as used to manufacture the cathode, except that the anode active material is used instead of the cathode active material. Also, the conductive material, the binder, and the solvent included in the anode active material composition may be the same as those used in the cathode active material composition. The anode includes graphite and a silicon-based compound as an anode active material.

In some embodiments, the anode active material, a conductive material, a binder, and a solvent are mixed to prepare an anode active material composition, which is directly coated on a copper current collector to manufacture an anode plate. In other embodiments, the anode active material composition is cast on a separate support, and then an anode active material film exfoliated from the support is laminated on a copper current collector to prepare an anode plate.

In some embodiments, the anode may further include, in addition to graphite and the silicon-based compound, other typical anode active materials that are different from the graphite and the silicon-based compound in terms of at least one of composition, particle diameter, and properties.

The other typical anode active material may be any one of various materials that are used as an anode active material for a lithium battery in the art. In some embodiments, the anode active material may include at least one selected from lithium metal, lithium-alloyable metal, transition metal oxide, non-transition metal oxide, and a carbonaceous material.

For example, the lithium-alloyable metal may be Si, Sn, Al, Ge, Pb, Bi, Sb, Si—$Y^1$ alloy (where $Y^1$ is alkali metal, alkali earth metal, a Group 13 element, a Group 14 element, transition metal, rare earth element, or a combination thereof element and with the proviso that $Y^1$ is not Si), or Sn—$Y^1$ alloy (where $Y^1$ is alkali metal, alkali earth metal, a Group 13 element, a Group 14 element, transition metal, rare earth element, or a combination thereof element and with the proviso that $Y^1$ is not Sn). The element $Y^1$ may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be titanium oxide, a vanadium oxide, or a lithium vanadium oxide.

For example, the transition metal oxide may be $SnO_2$, $SiO_x$ ($0<x<2$), or the like.

The carbonaceous material may be a crystalline carbon, an amorphous carbon, or a mixture thereof. The crystalline carbon may be natural or artificial graphite that is non-shaped, tabular, flake, spherical, or fibrous, and the amorphous carbon may be soft carbon (cold calcined carbon) or hard carbon, meso-phase pitch carbide, calcinded corks, or the like.

The amount of the anode active material, the conductive material, the binder, and the solvent may be at the same levels as used in lithium batteries.

Then, a separator which is to be inserted between the cathode and the anode is prepared. The separator may be any one of various materials typically used in a lithium battery. A material for forming the separator may be a material that has low resistance to ion migration of an electrolyte and has excellent electrolytic solution retaining capability. For example, the separator forming material may be selected from glass fiber, polyester, Teflon, polyethylene, polypropylene, polytetrafluoroethylene (PTFE), and a combination thereof, each of which may be in a non-woven fabric or woven fabric form. In some embodiments, the separator for a lithium ion battery may be a rollable separator formed of polyethylene or polypropylene, and the separator for a lithium ion polymer battery may be a separator having excellent organic electrolyte-retaining capabilities. For example, these separators may be prepared by using the following method.

In some embodiments, a separator composition is prepared by mixing a polymer resin, a filler, and a solvent. The separator composition may be directly coated or dried on an electrode to complete the formation of the separator. In other embodiments, the separator composition may be cast on a separate support and then a film separated from the support is laminated on an electrode, thereby completing the formation of the separator.

A polymer resin used in preparing the separator may not be particularly limited, and all the materials used for a binder of an electrode plate may be used. For example, a vinylidene fluoride/hexafluoropropylene copolymer, polyvinylidenefluoride (PVDF), polyacrylonitrile, polymethylmetacrylate, or a mixture thereof may be used.

Then, an electrolyte may be prepared.

For example, the electrolyte may be an organic electrolytic solution. Also, the electrolyte may be solid. For example, the solid electrolyte may be a boron oxide, lithium oxynitride, or the like, but the solid electrolyte may not be limited thereto. Any one of various materials that are used as a solid electrolyte in the art may be used herein. The solid electrolyte may be formed on the anode by, for example, sputtering.

In some embodiments, an organic electrolytic solution may be prepared. The organic electrolytic solution may be prepared by dissolving a lithium salt in an organic solvent.

The organic solvent may be any one of various materials used as an organic solvent in the art. In some embodiments, the organic solvent may be selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxorane, 4-methyldioxorane, N,N-dimethylformamide, dimethylacetamide, dimethylsufloxide, dioxane, 1,2-dimethoxyethane, sulforane, dichloroethane, chlorobenzene, nitrobenzene, diethyleneglycol, dimethylether, and any combination thereof.

The lithium salt may be any one of various materials used as a lithium salt in the art. In some embodiments, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers or integers), LiCl, LiI or a mixture thereof may be used.

Figure 4:
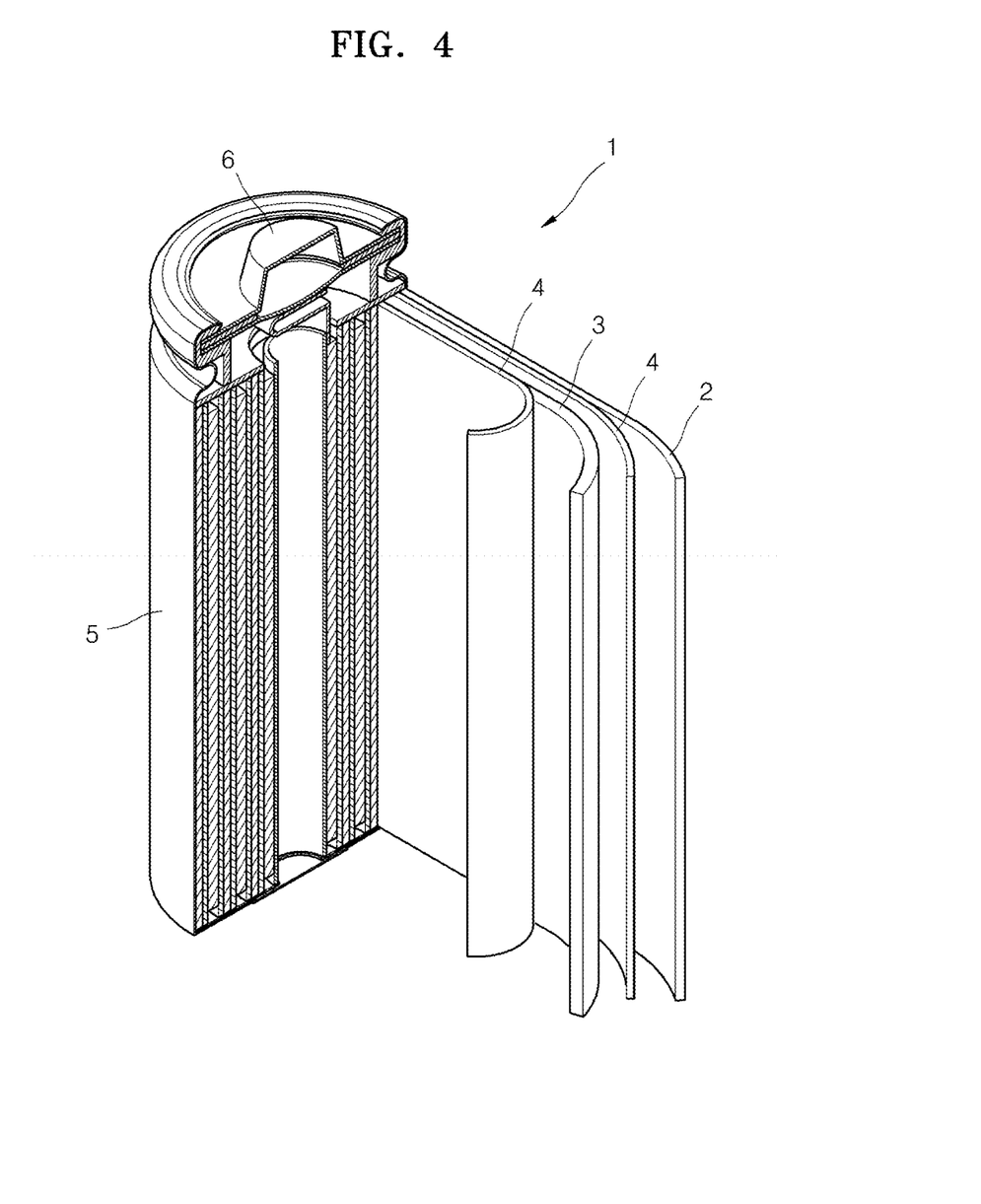
FIG. 4 is a schematic view of a lithium battery.

Referring to FIG. 4, a lithium battery 1 includes a cathode 3, an anode 2, and a separator 4. The cathode 3, the anode 2, and the separator 4 are wound or folded to be placed inside a battery case 5. Subsequently, an organic electrolytic solution is injected into the battery case 5, and the resulting structure is sealed with a cap assembly 6, thereby completing the manufacturing of the lithium battery 1. The battery case 5 may be a circular case, a rectangular case, or a thin-film type case. For example, the lithium battery may be a large thin film-type battery. The lithium battery may be a lithium ion battery.

The separator may be interposed between the cathode and the anode to form a battery assembly. When battery assemblies are stacked in a bi-cell structure, and the result structure is immersed in an organic electrolytic solution, and the obtained result is housed in a pouch, followed by being sealed to complete the manufacturing of a lithium ion polymer battery.

Also, a plurality of the battery assemblies may be stacked to form a battery pack, and the battery pack may be used in various devices that require high capacitance and high power output. For example, the battery pack may be used in a notebook, a smart phone, an electric vehicle, or the like.

In particular, due to its high energy density and lifespan characteristics, the lithium battery may be suitable for use in an electric vehicle (EV). For example, the lithium battery is suitable for use in a hybrid car, such as a plug-in hybrid electric vehicle (PHEV). Also, the lithium battery may be used in applications requiring a great amount of electric power. For example, the battery pack may be used in an electric vehicle, electrically drive tools, and so on.

The embodiments of the present invention are described in detail with reference to examples and comparative examples below. However, examples are provided here for illustrative purpose only, and do not limit the scope of the present invention.

Preparation of Nickel-Based Transition Metal Oxide

Preparation Example 1: One Body NCM $NiSO_4$, which is a nickel precursor, $CoSO_4$, which is a cobalt precursor, and $MnSO_4$, which is a manganese precursor, were added to water at a molar ratio of 0.5:0.2:0.3 to prepare a nickel cobalt manganese hydroxide precursor aqueous solution. While the aqueous solution was stirred, a sodium hydroxide aqueous solution was slowly added in a dropwise fashion thereto to mix the reaction mixture for 5 hours to neutralize the precursor aqueous solution, precipitating $Ni_{0.5}Co_{0.2}Mn_{0.3}(OH)_2$ which is a nickel cobalt manganese hydroxide. The precipitation is filtered and washed, and then dried at a temperature of 80° C. in the atmospheric condition to provide $Ni_{0.5}Co_{0.2}Mn_{0.3}(OH)_2$ powder having an average particle size of about 6 μm.

$Ni_{0.5}Co_{0.2}Mn_{0.3}(OH)_2$ powder was heat treated at a temperature of 600° C. in the atmospheric condition for 1 hour to produce a transition metal oxide from which water was removed, having a shape allowing lithium to easily permeate thereinto.

The transition metal oxide and $Li_2CO_3$, which is a lithium precursor, were prepared at a molar ratio of 1:0.525. The weight ratio of lithium with respect to each of nickel, cobalt, and manganese which are transition metal, was controlled to be about 1.05.

The prepared precursors were mixed in a mortar, and then, the mortar was placed in a furnace, and then while providing $O_2$, a heat treatment was performed thereon at a temperature of 1040° C. for 10 hours to complete the preparation of a cathode active material.

The cathode active material prepared as described above was $Li[Ni_{0.5}Co_{0.2}Mn_{0.3}]O_2$. In the cathode active material, the average particle size of a primary particle in the form of one body was 4 μm and the average particle size of a secondary particle was 6 μm.

The primary particle of the cathode active material was measured by SEM (FEI sirion), and the average particle size of the secondary particle was measured by an particle diameter analyzer (Beckman Coulter LS13 320).

Preparation Example 2: Ni-Doped LCO

In preparing typical LCO, Ni was used for doping. $Ni(OH)_2$ was used as an Ni supplier. $Li_2CO_3$, $Co_3O_4$, and $Ni(OH)_2$ were mixed and the mixture was heat treated. The temperature for the heat treatment was in a range of 1000 to 1100° C.

In the Ni-doped LCO prepared above, the amount of Ni was 5 mol % with respect to the total molar amount of Ni and Co.

Comparative Preparation Example 1: Commercially Available 523 NCM $Li[Ni_{0.5}Co_{0.2}Mn_{0.3}]O_2$ having a secondary particle with an average particle diameter of 6 μm was used as the cathode active material.

Comparative Preparation Example 2: Commercially Available LCO $LiCoO_2$ having a secondary particle with an average particle diameter of 16 μm was used as the cathode active material.

Preparation of Cathode, Anode, and Lithium Battery (Full Cell)

Comparative Example 1: Cathode (One Body NCM Alone)+Anode (Graphite:SiOx=90:10)

The cathode active material powder prepared according to the Preparation Example 1 and a carbon conductive material (Super P) were homogeneously mixed at a weight ratio of 97:1.5. A polyvinylidene fluoride (PVDF) binder solution was added thereto to prepare an active material slurry including the active material, the carbon conductive material, and the binder at a weight ratio of 97:1.5:1.5. The slurry was coated at a loading level of 40 mg/cm² on an aluminum current collector having a thickness of 12 μm by using a thick-film coater, and then, the slurry was dried at a temperature of 120° C. for 1 hour or more, followed by compression, thereby completing the manufacturing of a cathode having a mixture density of 3.7 g/cc.

(Preparation of Anode)

Graphite powder (Japan carbon), which is an anode active material, and SiOx (0<x<2) (ShinEtsu, Japan) were mixed at a weight ratio of 90:10, and then, the result mixture was mixed with a mixture including styrene butadiene rubber (SBR) and carboxymethyl cellulose (CMC) at a weight ratio of 1:1, at a weight ratio of 98:2, to prepare the anode active material slurry.

The anode active material slurry was coated at a loading level of 16 mg/cm² on a copper foil current collector having a thickness of 8 μm. When the coating was completed, the obtained electrode plate was dried at a temperature of 100° C. for 1 hour or more, followed by compression, thereby completing manufacturing of an anode having a mixture density of 1.6 g/cc.

Battery Assembling

A lithium battery (full cell) was manufactured by using the cathode, the anode, a polyethylene separator (STAR 20, Asahi, Japan), and an electrolyte prepared by dissolving 1.15M $LiPF_6$ in a mixed solvent including ethylenecarbonate (EC):ethylenemethylcarbonate (EMC):dimethylcarbonate (DMC) (a volumetric ratio of 3:3:4).

Example 1: Cathode (One Body NCM+Ni-Doped LCO)+Anode (Graphite:SiOx=90:10)

A lithium battery (full cell) having the same capacity as in Comparative Example 1 was manufactured in accordance with the procedures described in Comparative Example 1, except that as a cathode active material, a mixture including the cathode active material powder (one body NCM) prepared according to Preparation Example 1 and the cathode active material powder (Ni doped LCO) prepared according to Preparation Example 2 at a weight ratio of 10:90 was used instead of the cathode active material powder prepared according to Preparation Example 1.

Example 2: Cathode (One Body NCM+Ni-Doped LCO)+Anode (Graphite:SiOx=90:10)

A lithium battery (full cell) having the same capacity as in Comparative Example 1 was manufactured in accordance with the procedures described in Comparative Example 1, except that as a cathode active material, a mixture including the cathode active material powder (one body NCM) prepared according to Preparation Example 1 and the cathode active material powder (Ni doped LCO) prepared according to Preparation Example 2 at a weight ratio of 20:80 was used instead of the cathode active material powder prepared according to Preparation Example 1.

Example 3: Cathode (One Body NCM+Ni-Doped LCO)+Anode (Graphite:SiOx=90:10)

A lithium battery (full cell) having the same capacity as in Comparative Example 1 was manufactured in accordance with the procedures described in Comparative Example 1, except that as a cathode active material, a mixture including the cathode active material powder (one body NCM) prepared according to Preparation Example 1 and the cathode active material powder (Ni doped LCO) prepared according to Preparation Example 2 at a weight ratio of 30:70 was used instead of the cathode active material powder prepared according to Preparation Example 1.

Comparative Example 2: Cathode (One Body NCM Alone)+Anode (Graphite:SiOx=80:20)

A lithium battery (full cell) having the same capacity as in Comparative Example 1 was manufactured in accordance with the procedures described in Comparative Example 1, except that the mixture weight ratio of graphite powder (Japan carbon) and SiOx (0<x<2) (ShinEtsu), which were used as an anode active material, was changed from 90:10 to 80:20.

Comparative Example 3: Cathode (Commercially Available NCM Alone)+Anode (Graphite:SiOx=90:0)

A lithium battery (full cell) having the same capacity as in Comparative Example 1 was manufactured in accordance with the procedures described in Comparative Example 1, except that the cathode active material (commercially available NCM) prepared according to Comparative Preparation Example 1 was used instead of the cathode active material (one body NCM) prepared according to Preparation Example 1.

Comparative Example 4: Cathode (Commercially Available LCO Alone)+Anode (Graphite:SiOx=90:10)

A lithium battery (full cell) having the same capacity as in Comparative Example 1 was manufactured in accordance with the procedures described in Comparative Example 1, except that the cathode active material (commercially available LCO) prepared according to Comparative Preparation Example 1 was used instead of the cathode active material (one body NCM) prepared according to Preparation Example 1.

Comparative Example 5: Cathode (One Body NCM Alone)+Anode (Graphite:SiOx=97:3)

A lithium battery (full cell) having the same capacity as in Comparative Example 1 was manufactured in accordance with the procedures described in Comparative Example 1, except that the mixture weight ratio of graphite powder (Japan carbon) and SiOx (0<x<2) (ShinEtsu), which were used as an anode active material, was changed from 90:10 to 97:3.

Comparative Example 6: Cathode (One Body NCM Alone)+Anode (Graphite:SiOx=70:30)

A lithium battery (full cell) having the same capacity as in Comparative Example 1 was manufactured in accordance with the procedures described in Comparative Example 1, except that the mixture weight ratio of graphite powder (Japan carbon) and SiOx (0<x<2) (ShinEtsu), which were used as an anode active material, was changed from 90:10 to 70:30.

Evaluation Example 1: Scanning Electron Microscopy (SEM) Test

SEM images of the cathode active material prepared according to Preparation Example 1 and the cathode active material prepared according to Comparative Preparation Example 1 were obtained. Sirion, which is a SEM measuring device manufactured by FEI (USA), was used to obtain the images of the materials prepared.

Figure 1:
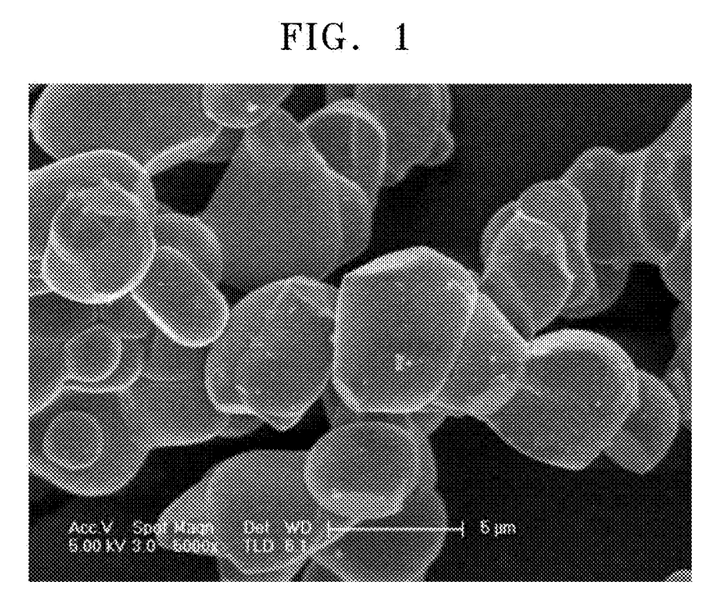
FIG. 1 is a scanning electron microscopy (SEM) image of a nickel-based lithium transition metal oxide prepared according to the Preparation Example 1.

FIG. 1 is a SEM image of the cathode active material prepared according to Preparation Example 1.

Figure 2:
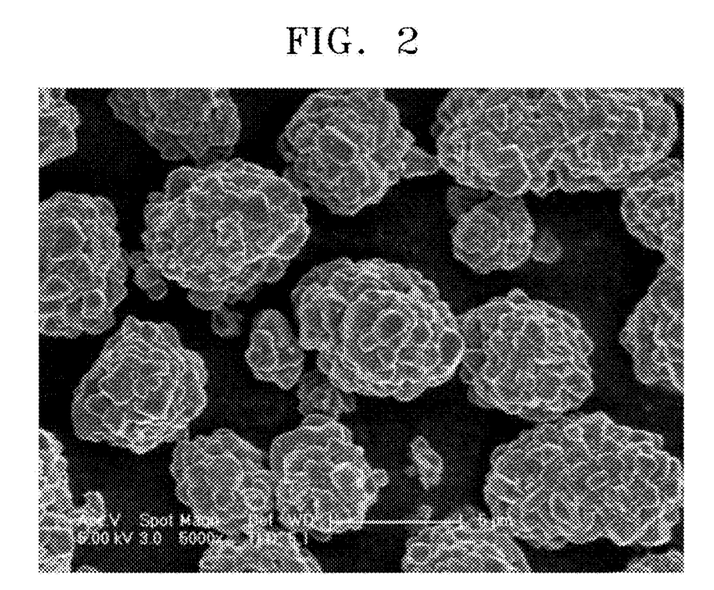
FIG. 2 is a SEM image of a nickel-based lithium transition metal oxide prepared according to the Comparative Preparation Example 1.

FIG. 2 is a SEM image of the cathode active material prepared according to Comparative Preparation Example 1.

Referring to FIG. 1, it was confirmed that the cathode active material prepared according to Preparation Example 1 has a greater primary particle average diameter than the cathode active material prepared according to Comparative Preparation Example 1.

The cathode active material prepared according to Comparative Preparation Example 1, that is, lithium transition metal oxide has a primary particle having a particle size of about 1 µm, and a secondary particle formed due to the aggregation of primary particles.

Evaluation Example 2: Measuring of pH and Residual Lithium

The pH of the cathode active materials prepared according to Preparation Example 1 and Comparative Preparation Example 1 was measured, and results thereof are shown in Table 1. This pH evaluation was performed as follows: 2 g of a cathode active material was stirred in 100 g of pure water for 10 minutes, and then, the pH of the resulted solution was measured by using a pH meter [Eutech, pH 6000].

The amounts of the residual lithium of the cathode active materials prepared according to Preparation Example 1 and Comparative Preparation Example 1 were measured, and results thereof are shown in Table 1. The residual lithium was evaluated by titration as follows: cathode active material powder was dissolved in water, followed by titration with a hydrochloric acid to measure the amounts of LiOH and $Li_2CO_3$ included in the cathode active material powder, and from the amounts, an amount of LiOH or $Li_2CO_3$ remaining on the surface of the cathode active material was measured.

Also, to identify the amount of lithium carbonate in the cathode active materials manufactured according to Preparation Example 1 and Comparative Preparation Example 1, GC-MS [gas chromatograph-mass spectrometer, Agilent 7000] analysis was performed thereon, and the results are shown in Table 1 below.

TABLE 1

|  | pH | Residual lithium (wt %) | | GC-MS analysis Amount of lithium carbonate (wt %) |
|---|---|---|---|---|
|  |  | LiOH | $Li_2CO_3$ |  |
| Comparative Preparation Example 1 | 11.1 | 0.086 | 0.135 | 0.09 |
| Preparation Example 1: | 10.3 | 0.02 | 0.085 | 0.03 |

Referring to Table 1, it was confirmed that the cathode active material of Preparation Example 1 has a smaller amount of lithium compound remaining on the surface of the cathode active material than the cathode active material of Comparative Preparation Example 1. The decrease in the residual lithium amount was also confirmed by identifying a decrease in pH in the surface of the cathode active material, which may lead to, in preparing a cathode slurry, increase of slurry stability and prevention of protruding or dragging on an electrode plate that may occur during coating.

Evaluation Example 3: Differential Scanning Calorimetry (DSC) Test

Figure 3:
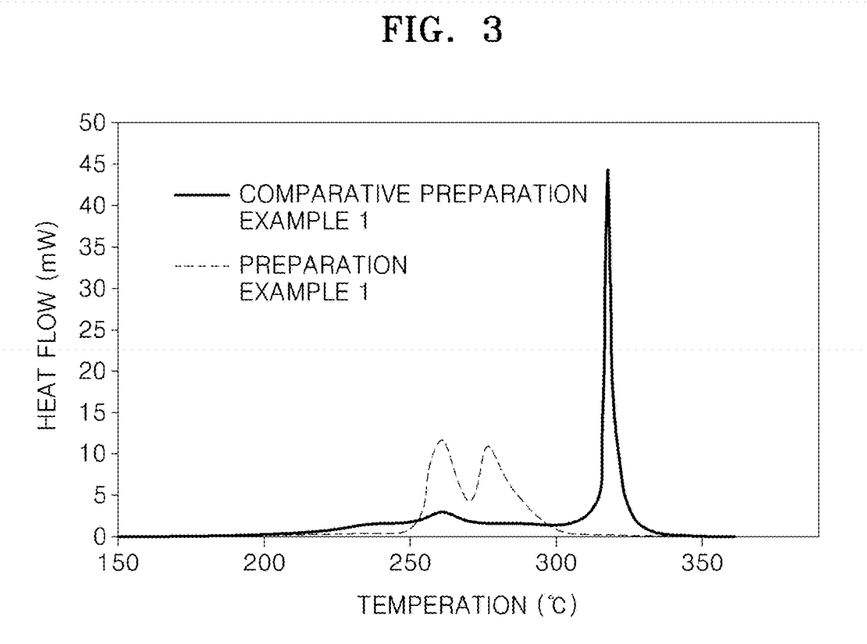
FIG. 3 shows a differential scanning calorimeter analysis graph of nickel-based lithium transition metal oxides prepared according to the Preparation Example 1 and the Comparative Preparation Example 1.

The thermal stability of the cathode active materials prepared according to Preparation Example 1 and Comparative Preparation Example 1 was analyzed by using a differential scanning calorimeter, and the results are shown in FIG. 3.

In FIG. 3, the cathode active material of Preparation Example 1 has a broader peak than the commercially available cathode active material of Comparative Preparation Example 1 due to the increase in high onset point and the decrease in main peak calorific value. From this result, it was confirmed that the cathode active material of Preparation Example 1 had high thermal stability.

Evaluation Example 4: Mixture Density Evaluation of Cathode

Layers of cathode active materials, which were the same as the cathode active materials included in the cathodes used in the full cells manufactured according to Example 1 to 3 and Comparative Example 1 to 6, were pressed, and then, the cathode active material layers were cut to a size of 30 mm×30 mm, and then, the thickness and weight were measured to calculate a mixture density. The mixture density is shown in Table 1.

As shown in Table 1, it was confirmed that the cathode of Example 1 including the cathode active material prepared according to Preparation Example 1 and lithium cobalt oxide had a higher mixture density than the cathode of Comparative Example 1 including the cathode active material prepared according to Comparative Preparation Example 1.

Evaluation Example 5: Charging and Discharging Characteristics Evaluation of Lithium Battery (Half Cell)

Half cells were manufactured in the same manner as used to manufacture the full cells manufactured according to Examples 1 to 3 and Comparative Examples 1 to 6, except that lithium metal was used as a reference electrode with respect to the cathodes and the anodes.

Regarding the cathode, charging was performed with a constant current at a temperature of 25° C. at a rate of 0.1 C until the voltage reached 4.3V (vs. Li), and then, while the voltage was maintained at 4.3V, charging was performed at the constant voltage until the current reached 0.01 C. Then, until the voltage reached 3.0 V (vs. Li), discharging was performed at a constant voltage at a rate of 0.1 C. The charging capacity obtained during the charging and discharging was measured, and from the charging capacity, an initial charging and discharging capacity was measured.

Regarding the anode, charging was performed with a constant current at a temperature of 25° C. at a rate of 0.1 C until voltage reached 0.01V (vs. Li), and then, while the voltage was maintained at 0.01 V, charging was performed at the constant voltage until the current reached 0.01 C. Then, until the voltage reached 1.5V (vs. Li), discharging was performed at a constant voltage at a rate of 0.1 C. By using the charging capacity obtained during the charging and discharging, the initial charging and discharging capacity was measured.

Charging and discharging test results are shown in Table 2 below. Initial charging and discharging efficiency is represented by Equation 1 below.

Initial charging and discharging efficiency [%]=[discharge capacity/charging capacity]×100  <EQUATION 1>

TABLE 2

|  | Initial charging and discharging efficiency [%] | | Cathode mixture density [g/cc] |
|---|---|---|---|
|  | Cathode | Anode |  |
| Comparative Example 1 | 85 | 85 | 3.4 |
| Example 1 | 91.2 | 85 | 3.95 |
| Example 2 | 90.5 | 85 | 3.95 |
| Example 3 | 89.7 | 85 | 3.9 |
| Comparative Example 2 | 85 | 81 | 3.4 |
| Comparative Example 3 | 89 | 85 | 3.3 |
| Comparative Example 4 | 95 | 85 | 3.95 |
| Comparative Example 5 | 85 | 88 | 3.4 |
| Comparative Example 6 | 85 | 79 | 3.4 |

As shown in Table 2, the cathodes of Examples 1 to 3 had higher initial charging and discharging efficiency than the anodes of Examples 1 to 3. The initial charging and discharging efficiency of the cathodes of Examples 1 to 5 was 91.2%. The mixture density of the cathodes of Examples 1 to 5 was 3.5 g/cc or more.

Although not shown in the table above, the initial charging capacity of the cathodes of Examples 1-3 was 200 mAh/g or more.

Evaluation Example 6: Charging and Discharging Characteristics Evaluation of Lithium Battery (Full Cell)

The full cells manufactured according to Examples 1 to 3 and Comparative Examples 1 to 6 were charged with a constant current at a temperature of 25° C. at a rate of 0.2 C until the voltage reached 4.3 V, and then, while the voltage was maintained at 4.3 V, the full cells were charged at a constant voltage until the current reached 0.01 C. Subsequently, during discharging, the full cells were discharged at a constant current of a rate of 0.2 C until the voltage reached 2.75 V.

Then, the full cells were charged with a constant current at a rate of 0.5 C until voltage reached 4.3 V, and while the voltage was maintained at 4.3 V, the full cells were charged at the constant voltage until the current reached 0.01 C. Then, during discharging, until the voltage reached 2.75 V, the full cells were discharged at a constant current of 0.5 C (Formation process).

The lithium batteries, which had been subjected to the formation process, were charged with a constant current at a temperature of 25° C. at a rate of 1.0 C until voltage reached 4.3 V, and while the voltage was maintained at 4.3 V, the full cells were charged at the constant voltage until the current reached 1.01 C. Then, during discharging, until the voltage reached 2.75 V, the lithium batteries were discharged at a constant current of 1.0 C. This charge/discharge cycle was repeated 100 times.

The charging and discharging test results are shown in Table 3 below. An initial discharge capacity is a discharging capacity in the first cycle, and a capacity retention ratio is obtained according to Equation 2.

Capacitance retention ratio [%]=[discharge capacitance in $100^{th}$ cycle/discharge capacitance in $1^{st}$]×100  <EQUATION 2>

TABLE 3

| | In $1^{th}$ cycle discharging capacity [mAh] | In $100^{th}$ cycle capacitance retention ratio [%] |
|---|---|---|
| Comparative Example 1 | 1335 | 93 |
| Example 2 | 1420 | 95 |
| Example 3 | 1448 | 96 |
| Example 4 | 1485 | 95 |
| Comparative Example 2 | 1341 | 93 |
| Comparative Example 3 | 1375 | 91 |
| Comparative Example 4 | 1393 | 93 |
| Comparative Example 5 | 1339 | 93 |
| Comparative Example 6 | 1337 | 89 |

As shown in Table 3, the lithium batteries of Examples 1 to 3 had higher discharge capacity and longer lifespan characteristics than the lithium batteries of Comparative Examples 1 to 6.

The lithium battery according to an embodiment of the present invention includes a cathode having a novel composition and an anode having a novel composition. Due to the inclusion of the cathode and the anode, discharging capacity and lifespan characteristics of the lithium battery may improve.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A lithium battery comprising a cathode; an anode; and an electrolyte disposed between the cathode and the anode,
wherein the cathode comprises a nickel-based lithium transition metal oxide having one body primary particles having an average particle diameter of about 3 μm and less than about 5 μm and a lithium cobalt oxide, and
wherein the anode comprises graphite and a silicon-based compound,
wherein the amount of the silicon-based compound is in the range of about 5 wt % to about 25 wt % based on the total weight of graphite and the silicon-based compound,
wherein an initial charging and discharging efficiency of the cathode is equal to or greater than an initial charging and discharging efficiency of the anode, and
wherein an amount of residual LiOH is 0.01 wt % to 0.06 wt % based on the total weight of nickel-based lithium transition metal oxide.

2. The lithium battery of claim 1, wherein the amount of the silicon-based compound is about 5 wt % or more based on the total weight of the graphite and the silicon-based compound.

3. The lithium battery of claim 1, wherein the silicon-based compound is silicon, silicon alloy, or silicon oxide.

4. The lithium battery of claim 1, wherein the silicon-based compound is a silicon oxide represented by Formula 1 below:

$SiO_x$  <Formula 1> wherein 0<x<2.0.

5. The lithium battery of claim 1, wherein the silicon-based compound is selected from Si or Si—$Y^1$ alloy, wherein $Y^1$ is alkali metal, alkali earth metal, a Group 13 element, a Group 14 element, transition metal, rare earth element, or a combination thereof element and with the proviso that $Y^1$ is not Si.

6. The lithium battery of claim 1, wherein the nickel-based transition metal oxide is a compound represented by Formula 2 below:

$Li_xCo_aNi_bM_cO_{2+\alpha}$  <Formula 2> wherein 0.9<x<1.5, 0<a<0.5, 0<b<1, 0<c<1, and −0.1<α<0.1, and
M comprises at least one element selected from the group consisting of Mg, Ca, Sr, Ba, Ti, Zr, Nb, Mo, W, Zn, Al, Si, Ni, Mn, Cr, Fe, Mg, Sr, V, and a rare-earth element.

7. The lithium battery of claim 1, wherein the nickel-based transition metal oxide is a compound represented by Formula 3 below:

$Li_xCo_aNi_bMn_cO_{2+\alpha}$  <Formula 3> wherein 0.9<x<1.1, 0<a<0.5, 0.4<b<1, 0<c<0.5, and −0.1<α<0.1.

8. The lithium battery of claim 1, wherein the nickel-based transition metal oxide is a compound represented by Formula 4 below:

$Li_xCo_aNi_bMn_cO_2$  <Formula 4> wherein 0<x<1.1, 0.1<a<0.3, 0.4<b<0.6, 0<c<0.5, and 0.2<c<0.4.

9. The lithium battery of claim 1, wherein in differential scanning calorimeter analysis of the nickel-based lithium transition metal oxide has an onset point temperature in the range of about 250° C. to about 270° C.

10. The lithium battery of claim 1, wherein the amount of the lithium cobalt oxide is 65 wt % or more based on the total amount of the nickel-based lithium transition metal oxide and the lithium cobalt oxide.

11. The lithium battery of claim 1, wherein the amount of the lithium cobalt oxide is in the range of about 70 wt % to 90 wt % based on the total amount of the nickel-based lithium transition metal oxide and the lithium cobalt oxide.

12. The lithium battery of claim 1, wherein nickel is doped on at least a portion of the lithium cobalt oxide.

13. The lithium battery of claim 1, wherein the amount of nickel is 20 mol % or less based on the total molar amount of nickel and cobalt.

14. The lithium battery of claim 1, wherein an initial charging and discharging efficiency of the cathode is 91.5% or less.

15. The lithium battery of claim 1, wherein the cathode has a mixture density of about 3.5 g/cc or greater.

16. The lithium battery of claim 1, wherein an initial charging and discharging efficiency of the anode is 88.0% or less.

17. The lithium battery of claim 1, wherein the cathode has an initial charging capacity of about 200 mAh/g or more.

18. The lithium battery of claim 1, wherein the primary particles of the nickel-based transition metal oxide have an average particle diameter of about 3 μm or greater to about 4 μm.

* * * * *